Figure 1:
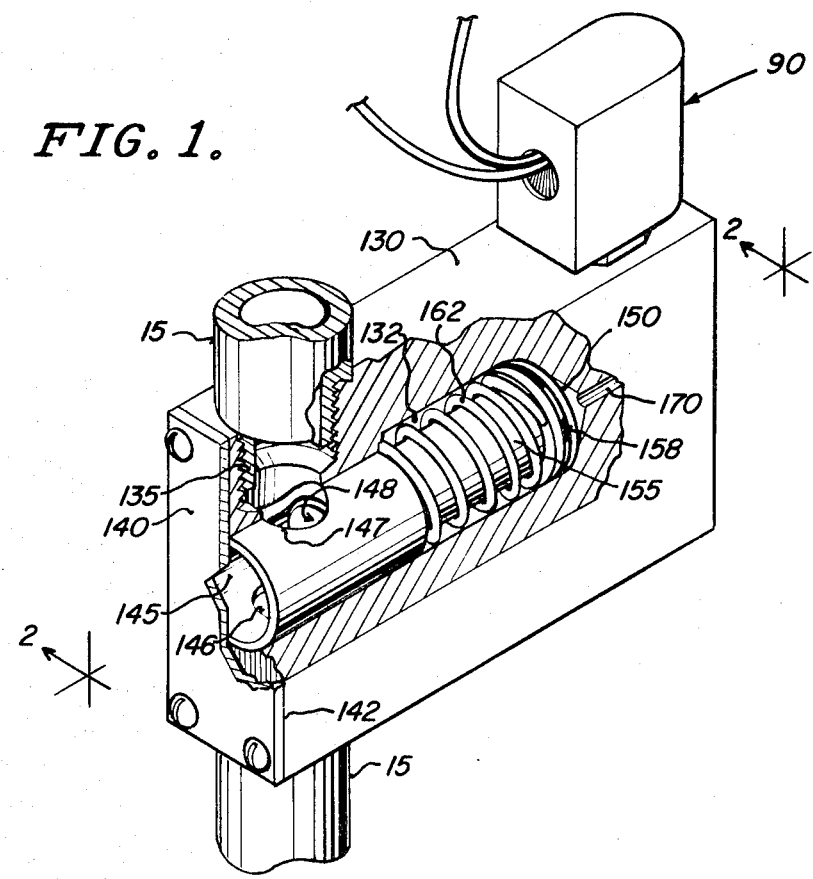

United States Patent [19]

Beguiristain

[11] 3,727,877
[45] Apr. 17, 1973

[54] PILOTED SHUT-OFF VALVE
[75] Inventor: Luis Beguiristain, St. Paul, Minn.
[73] Assignee: Chayes Dental Instrument Corporation, Danbury, Conn.
[22] Filed: Sept. 15, 1971
[21] Appl. No.: 180,568

Related U.S. Application Data
[62] Division of Ser. No. 16,381, March 4, 1970, Pat. No. 3,636,974.

[52] U.S. Cl. .................................. 251/30, 251/63
[51] Int. Cl. ..................... F16k 31/143, F16k 31/42
[58] Field of Search ................................. 251/30, 63

[56] References Cited

UNITED STATES PATENTS

| 1,595,755 | 8/1926 | Brooks et al. | 251/30 X |
| 2,379,536 | 7/1945 | Mackenzie | 251/30 X |
| 1,717,071 | 6/1929 | Smith | 251/30 X |

FOREIGN PATENTS OR APPLICATIONS

| 919,621 | 0/1963 | Great Britain | 251/30 |

Primary Examiner—Arnold Rosenthal
Attorney—Everett J. Schroeder et al.

[57] ABSTRACT

A piloted shut-off valve particularly adapted for use in evacuator systems to control flow from a single vacuum source. The shut-off valve includes a valve body having a bore therethrough with a piston controlling flow between ports in the body, the piston defining with the bore a pilot chamber in which a three-way piloted valve controls the position of the piston and with the three-way valve being controlled from an electric source. The valve will operate in any position of the valve body irrespective of the force of gravity.

6 Claims, 2 Drawing Figures

PATENTED APR 17 1973          3,727,877

INVENTOR.
LUIS (NMI) BEGUIRISTAIN II

BY
Schroeder Siegfried Ryan & Vidas
ATTORNEYS

PILOTED SHUT-OFF VALVE

This application is a division of my co-pending application Ser. No. 16,381, filed Mar. 4, 1970, now U.S. Pat. No. 3,636,974 and entitled EVACUATOR SYSTEM WITH SHUT-OFF VALVE.

My invention relates to improvements in a simplified piloted shut-off valve particularly adapted for use in evacuator systems controlling flow from a vacuum source.

Piloted shut-off valves are broadly old and in use. The improved piloted shut-off valve of the present invention is particularly adapted for use in evacuator systems controlling flow from a vacuum source in that it includes control components which are operative and independent of the force of gravity. The improved piloted valve includes a block like valve body with a bore therein and a piston mounted in the bore. One end of the piston cooperates with ports through the valve body to control the vacuum source of flow therethrough. The piston provides with the bore in the valve body a pilot chamber into which air under pressure is introduced to actuate the piston against the force of a return spring. A three-way piloted valve controls air flow into the pilot chamber of the piston with the three-way valve being a solenoid type valve operated from an electric source. The improved construction and arrangement of parts insures that the main valve member is insensitive to gravity and hence can be mounted in any position in an evacuator system. It provides a simplified piloted valve which may be used with a plural station evacuator system with valves of this type isolating each station except when in use. The system with which it is used permits the improved piloted shut-off valve to seal branch lines at each station with the individual valves to be controlled by hanger switches or equivalent electric controls at each station. The pilot operator controls through a solenoid and air source operating the piston in the shut-off valve for the purpose of closing the same. The overall structure of the piloted valve is simple in that the valve body employs a simplified bore in which the piston is mounted and with simplified valve and spring bias arrangement to provide an improved low cost shut-off valve design which is easy to use and maintain.

Therefore it is the principal object of this invention to provide an improved piloted shut-off valve.

Another object of this invention is to provide an improved piloted shut-off valve which is particularly adapted for use in evacuator systems.

A further object of this invention is to provide a valve of this type which is low in cost and which is easy to use, install and maintain.

Figure 2:
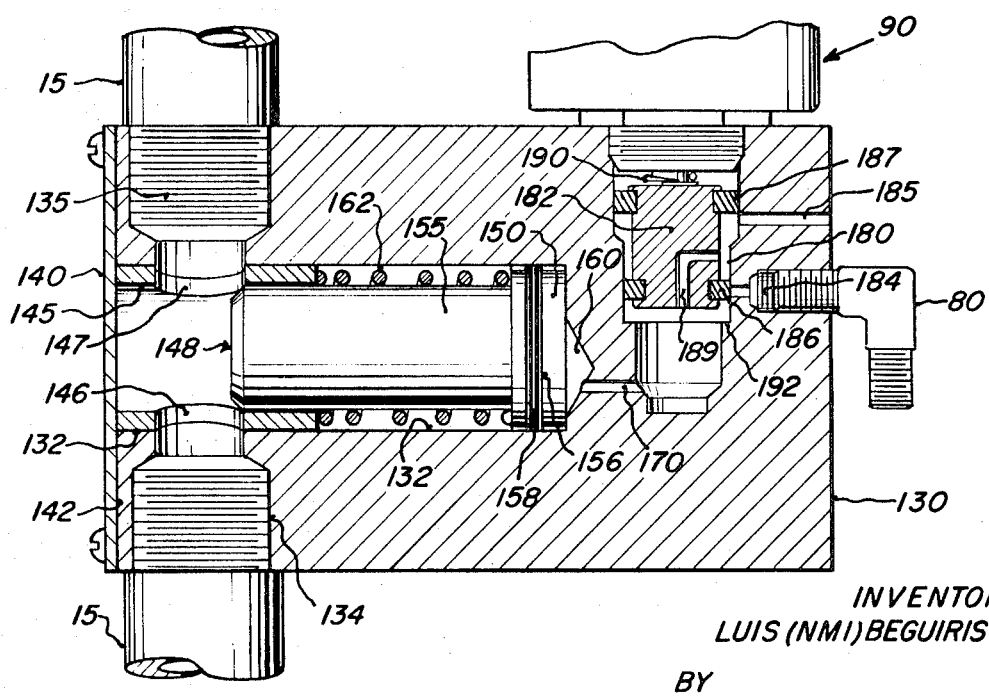

These and other objects of this invention will become apparent from a reading of the attached description together with the drawings wherein:

FIG. 1 is a perspective view of the shut-off valve with parts broken away to show the shape and relationship of the parts thereof, and FIG. 2 is a sectional view of the piloted shut-off valve taken along the lines 2—2 in FIG. 1.

The improved piloted shut-off valve as shown in FIGS. 1 and 2 includes a valve body designated at 130. It is generally rectangular in cross section having a low profile and is a metallic block having a bore 132 extending from one edge of the same and centrally therein part way through the body. This bore is of uniform diametrical dimension and milled into the block. Extending transversely thereto near the open end of the same are ports 134, 135 on either side of the body which communicate with this central bore 132. These ports connect to the vacuum or pressure line conduits 15, as indicated in the drawings. A cover 140 and including a gasket 142 is positioned over the end of the body to close and seal the same which is readily removable for inspection and maintenance in the valve. Positioned within the bore is a cylindrical sleeve member 145 which also includes ports 146 and 147 therein of the same diametrical dimension and adapted to mate with the ports 134, 135 in the body. Co-operating with this sleeve is a piston 148 of the shut-off valve which includes in a cylindrical head portion 150 having a diametrical dimension substantially equal to that of the bore 132 and being lapped or machined so that it would freely slide therein. The remaining portion of the piston or reduced body portion 155 has a diametrical dimension substantially equal to the interior dimension of the sleeve 145 and these portions are lapped to provide a smooth substantially air tight fit. The head portion includes a groove or surface 156 with a suitable sealing ring 158 therein and a portion of the bore above the piston, indicated generally at 160, defines a pilot pressure chamber for the shut-off valve. A helical compression spring 162 is positioned between the sleeve 145 and the head portion 150 of the piston to urge the piston into the bore and in the direction of the pilot pressure chamber. Air under pressure in this chamber will overcome the bias of the spring and cause the body portion 155 of the piston to slidably move down across the ports 146, 147 of the sleeve member 145 to close off the same and hence the passage through the valve body.

The pilot pressure chamber 160 has connected thereto a small port 170 leading to a second bore 180 in the valve body which extends generally transversely to the main bore 132 and above the same in the valve body. A solenoid actuator 90 attaches to this bore and carries a spool valve 182 for the purpose of valving air from the air pressure line 80 through a passage 184 communicating with the bore 180 and a vent passage 185 extending to the surface of the valve. The spool valve has lands 186, 187 thereon which co-operate with the passages 185 and 184 in the body to control flow of air under pressure to and from the bore 180 and the pilot chamber 160 through the passage 170. An internal passage 189 in the spool valve will provide an air passage from the end of the bore 180 through the spool valve to the area between the lands 186, 187 so that air flow may be directed into and out of the passages 185, 184. A compression spring 190 included with the solenoid urges the spool into the bore and against a shoulder 192 therein. Energization of the electric solenoid will overcome the bias of the spring and move the spool in the opposite direction and against the compression of the spring. This movement will cover and uncover the passages 184, 185 for the purpose of valving air into and out of the bore 180 and communicating through the passage 170 to the pilot chamber 160 above the head portion 150 of the piston. The valve is operated to a shut-off position by introducing the air under pressure from an air source or line 80 and through the passage 184 connected thereto in the valve body. With de-energization of the solenoid, the spring 190 moves the spool to a position where the land 187 covers the vent passage 185 and uncovers the passage 184 permitting flow of air under pressure to the area between the lands and through the passage 189 in the spool to the interior of the bore 180 wherein it will be directed through the passage 170 and into the pilot pressure acting chamber. This air under pressure on the head 150 of the piston 148 will overcome the tension of the compression spring 162 which bears against the head and between the head and the sleeve to move the piston down so that the valve closure portion or reduced body portion 155 of the piston will move and cover the ports 146, 147 in the sleeve closing the passage through the valve body for the vacuum line.

By release of this pressure through energization and operation of the solenoid 90 to overcome the bias of spring 190, the fluid above the enlarged head portion 150 of the piston is evacuated through the vent passage 185 since energization of the solenoid will move the spool to block the passage 184 and open the passage 185. Under these conditions the compression spring acting on the piston will move to the same against the vented air in the pilot pressure chamber to move the reduced portion of the piston 155 upwardly uncovering the ports 146, 147 in the valve body. The lapped fitting between the latter parts minimizes leakage in the valve body. Further, the pilot fluid is sealed from this portion of the valve body by the dynamic seal 158 on the piston head which isolates air under pressure from the pilot chamber into the area of the shut-off valve.

The shut-off valve is a simplified structure having a low profile smooth exterior which permits mounting the same in various positions and because it is a piloted actuator with a spring return, with an electric solenoid for operating the same the valve body may be mounted in varying angular positions since it will not be effected in its operation by the force of gravity. Thus, the shut-off valve may be mounted in varying angular positions.

In considering this invention therefore it should be remembered that the present disclosure is illustrative only and the scope of the invention should be determined by the appended claims.

What is claimed is:

1. A piloted shut-off valve for a vacuum line comprising, a valve body, a cylindrical valve bore positioned in the body, a pair of ports in the body communicating with the cylindrical bore, piston means positioned in the valve body and defining a pilot pressure chamber between the end of the piston means and the end of the bore, an inlet air passage positioned in the valve body and extending into the bore to the pilot pressure chamber, bias means positioned in the valve bore and applying a force to the piston means in a direction of the pilot chamber, a vent passage in the valve body, and electrically operated control valve means positioned in the inlet air passage and the vent passage in the valve body and selectively connecting the inlet air passage and the vent passage to the pilot pressure chamber, and a cylindrical sleeve member positioned in the bore and having ports therethrough aligned with the ports in the valve body, said sleeve member mounting a portion of the piston means which is adapted to move therein to cover and uncover the ports under the influence of pressure in the pilot pressure chamber and the action of the bias means, said piston means having a cylindrical head and a reduced cylindrical body portion with the head portion slidably mounted in the cylindrical bore of the valve body and with the body portion slidably mounted in the sleeve member to open and close the ports therein.

2. The piloted shut-off valve of claim 1 in which the control valve means is a three-way valve operated by an electric solenoid.

3. The piloted shut-off valve of claim 1 and including a sealing ring positioned on the cylindrical head portion of the piston means to provide an air tight sliding seal for the piston means sealing the pilot pressure chamber from the ports in the body.

4. The piloted shut-off valve of claim 3 in which the bias means is a helical compression spring encircling the body portion of the piston means and bearing against the head portion of the piston means and the sleeve member.

5. The piloted shut-off valve of claim 4 and including a second bore in the valve body extending transverse to the first named bore in the body, a passage connecting the second bore to the first bore and the pilot pressure chamber, a pair of passages extending from the second bore outside of the body with one of said passages being the air inlet passage and one being the vent passage, and in which the electrically operated control valve is a solenoid operated valve means positioned in the second bore and selectively connecting one of the pair of passages in the valve body to the first named passage in the valve body.

6. The piloted shut-off valve of claim 5 and including a removable cover means sealed and removably connected to the valve body for covering the first named bore.

* * * * *